United States Patent
Leinonen et al.

(10) Patent No.: US 10,246,176 B2
(45) Date of Patent: Apr. 2, 2019

(54) AUTOMATED BALLOON LAUNCHING SYSTEM AND METHOD FOR LAUNCHING

(71) Applicant: Vaisala Oyj, Vantaa (FI)

(72) Inventors: Ismo Leinonen, Espoo (FI); Tuomo Saari, Vantaa (FI)

(73) Assignee: Vaisala Oyj, Vantaa (FI)

( * ) Notice: Subject to any disclaimer, the term of this patent is extended or adjusted under 35 U.S.C. 154(b) by 447 days.

(21) Appl. No.: 15/229,248

(22) Filed: Aug. 5, 2016

(65) Prior Publication Data

US 2016/0340015 A1 Nov. 24, 2016

Related U.S. Application Data

(63) Continuation-in-part of application No. PCT/FI2015/050073, filed on Feb. 6, 2015.

(30) Foreign Application Priority Data

Feb. 6, 2014 (FI) .................................... 201445120

(51) Int. Cl.
*G01W 1/08* (2006.01)
*B64B 1/00* (2006.01)
(Continued)

(52) U.S. Cl.
CPC ............... *B64B 1/005* (2013.01); *B64B 1/40* (2013.01); *B64B 1/62* (2013.01); *G01W 1/08* (2013.01)

(58) Field of Classification Search
CPC . B64B 1/005; B64B 1/40; B64B 1/62; G01W 1/08
See application file for complete search history.

(56) References Cited

U.S. PATENT DOCUMENTS

| 5,548,283 A * | 8/1996 | Martin | G01W 1/08 340/870.01 |
| 5,636,480 A * | 6/1997 | Lauritsen | B64F 1/14 244/33 |

(Continued)

FOREIGN PATENT DOCUMENTS

| AU | 200247513 A1 | 12/2002 |
| CN | 201449457 U | 5/2010 |

(Continued)

OTHER PUBLICATIONS

ARM Climate Research Facility: "Up, Up, and Away—Automated Balloon Launcher Headed to North Slope", Jun. 15, 2010, https://www.arm.gov/news/facility/post/9005, Retrieved on Jul. 28, 2017.

*Primary Examiner* — Justin M Benedik
(74) *Attorney, Agent, or Firm* — Seppo Laine Oy

(57) ABSTRACT

According to an example aspect of the present invention, there is provided an automated balloon launching system for launching at least one balloon such as a meteorological balloon or a radiosonde. The system comprises a container and a storage arranged in the container for storing at least one box at a defined storage position p=1, 2, . . . , n. The at least one box includes a balloon and a sonde. A release silo is arranged at least partially on top of or above and adjacent to the container for sheltering the balloon during inflation. A x-, y- and z-manipulator is arranged in the container for removing a specific box from one of the defined storage positions p=1, 2, . . . , n, and for subsequent feeding the release silo with the specific box. The present invention also concerns a method for launching at least one balloon such as a meteorological balloon or a radiosonde.

22 Claims, 7 Drawing Sheets

(51) Int. Cl.
  *B64B 1/40*  (2006.01)
  *B64B 1/62*  (2006.01)

(56) References Cited

U.S. PATENT DOCUMENTS

| | | | |
|---|---|---|---|
| 5,884,862 A | | 3/1999 | Aurilio et al. |
| 5,895,010 A | | 4/1999 | Aurilio et al. |
| 5,901,922 A | * | 5/1999 | Aurilio .................. G01W 1/08 244/1 TD |
| 9,327,844 B2 | * | 5/2016 | Ratner ..................... B64F 1/04 |
| 2005/0006523 A1 | * | 1/2005 | French .................... G01W 1/08 244/31 |
| 2016/0340015 A1 | * | 11/2016 | Leinonen ................ G01W 1/08 |

FOREIGN PATENT DOCUMENTS

| | | |
|---|---|---|
| CN | 201503503 U | 7/2010 |
| CN | 201527483 U | 7/2010 |
| CN | 101963677 A | 2/2011 |
| CN | 102253429 A | 11/2011 |
| JP | 2006036104 A | 2/2006 |
| JP | 3841356 B2 | 8/2006 |
| KR | 20110052835 A | 5/2011 |
| WO | WO2010000942 A1 | 1/2010 |
| WO | WO2010061034 A1 | 6/2010 |

\* cited by examiner

AUTOMATED BALLOON LAUNCHING SYSTEM AND METHOD FOR LAUNCHING

RELATED APPLICATIONS

This application is a Continuation-in-Part of International PCT Application No. PCT/FI2015/050773, filed on Feb. 6, 2015, which claims priority to Finnish Patent Application Ser. No. 20145120, filed on Feb. 6, 2014. The subject matter of which are incorporated by reference herein in their entirety.

TECHNICAL FIELD OF THE INVENTION

The present invention relates to an automated balloon launching system. More particularly, the present invention is directed to an automated balloon launching system for launching at least one balloon such as a meteorological balloon or a radiosonde. The present invention also relates to a method for launching at least one balloon such as a meteorological balloon or a radiosonde.

BACKGROUND OF THE INVENTION

AU 200247513 discloses a system for filling a balloon, such as a meteorological balloon, with a fluid medium such as gas. The system includes a filling nozzle for admitting the medium to the balloon, measurement means for measuring flow of the medium to the filling nozzle and flow control means for controlling the flow of the medium to the filling nozzle. The system also includes processing means, responsive to the measurement means, for establishing according to a predetermined criteria when a predetermined amount of the medium has been admitted to the balloon. Upon reaching the predetermined amount, the processing means causes the flow control means to terminate the flow of the medium. A method for filling the balloon is also provided.

KR 102011052835 A teaches an automatic radiosonde gas injecting and fixing apparatus to secure the safety of an operator and supply accurate buoyancy of a sonde by automating a series of a sonde preparing process. A weight measuring load cell automatically opens and closes the gas of a radiosonde balloon part. An indicator functions the amplification of electric signals. An automatic opening and closing unit implements an automatic opening and closing operation according to the electric signals. A balloon automatic fastener and forceps are further included in an automatic radiosonde gas injecting apparatus.

CN 201527483 U discloses a sounding balloon releasing cylinder, which includes a cylinder, top covers, a base and supporting racks. The supporting rack is fixed on the base. A pair of electrical control devices controlling the top covers to open and close is mounted on the supporting racks on the two sides of the cylinder. The electrical control device includes a motor, a worm and worm gear speed reducer and a four linkage-rod transmission mechanism. The four linkage-rod transmission mechanism is connected with the left and the right symmetrical and matched top covers, and controls the top covers to open and close. A balloon releasing mechanism and a charging nozzle are mounted at the bottom inside the cylinder. The sounding balloon releasing cylinder has simple structure, convenient operation and good safety. For releasing balloons, all that is needed is to start an electric control device switch, and then the balloon can be released automatically and flies out from a sounding balloon releasing cylinder. The sounding balloon releasing cylinder can be used for releasing various balloons for detecting the meteorological conditions of high altitude environment or atmospheric environment.

JP 3841356 B9 teaches a balloon releasing system capable of inflating normally a balloon for observation in a balloon releasing tower to release safely the balloon. A gas supply port is provided in a moving-directional tip side, in a tray horizontally movable from a balloon release preparation chamber toward an inside of a cylindrical body through an opening of the cylindrical body in the balloon releasing tower of a chamber adjacent thereto, and an intake port of the balloon for the observation before filling gas is connected disconnectably to the gas supply port. A sheet of excellent water repellency is extended in the periphery of the opening on an inner circumferential face of the cylindrical body.

CN 102253429 A describes full-automatic air sounding equipment. The equipment comprises a monitoring center and a remote unmanned aerological detection station which perform wireless communication with each other, wherein the unmanned aerological detection station is used for storing and launching an air sounding balloon, and receiving/transmitting air sounding data. The monitoring center is used for receiving and processing the aerological detection data returned by the unmanned aerological detection station, and monitoring the operation of the unmanned aerological station. The unmanned aerological detection station comprises an equipment shelter, a control computer, a data processing computer, high-wind balloon-releasing equipment, network equipment and the air sounding balloon. The control computer performs wireless communication with the monitoring center through the network equipment. The control computer controls actions of the heavy-wind balloon-releasing equipment. The control computer, the heavy-wind balloon-releasing equipment, the network equipment and the non-inflated air sounding balloon are arranged in the equipment shelter. The non-inflated air sounding balloon is launched by the heavy-wind balloon-releasing equipment. The equipment can be used for realizing full-automatic operation without human intervention.

CN 201503503 U discloses an automatic sounding balloon inflating device, which comprises a gas supply source, an inflating valve, a gas supply valve, an inflating amount control unit, an inflating valve control unit and a processing unit, wherein the inflating valve is connected with the gas supply source, and the gas supply valve is arranged between the inflating valve and the gas supply source. The inflating amount control unit is arranged between the gas supply source and the gas supply valve to output an inflating amount control signal, and the valve control unit is connected with the inflating valve and sends a first position signal and a second position signal. The processing device is connected with the valve control unit, the gas supply valve inflating amount control unit and the inflating valve control unit. The utility model can automatically inflate sounding balloons without manual intervention.

CN 101963677 A describes an atmospheric sounding high-wind ball-releasing system which comprises a cylindrical ball-releasing cylinder, a container top cover, a top cover following system, a top cover starting system, an automatic charging ball system, a dropsonde spinning reel and a ground weather instrument, wherein the top of the ball-releasing cylinder is provided with the container top cover, the ball-releasing cylinder comprises a cover and a rotary bearing arranged on a cylindrical opening, and the cover is arranged at the upper part of the rotary bearing rotating around the ball-releasing cylinder. The section of the cover is in a hyperbolic curve. The rotary bearing comprises a static rail and a rotating support, in the top cover following system, the container top cover is arranged on the rotary bearing, a drive device of the rotary support is an installed servo motor, after the servo motor obtains wind direction information according to wind direction measured according to the ground dropsonde or the wind direction measured according to a wind pressure sensor, a microprocessor drives the rotary support to rotate according to a set program to ensure that the opening direction of the container top cover faces to the windward direction. The top cover opening system comprises a hydraulic pump station, a hydraulic cylinder and a connecting rod.

CN 201449457 U teaches an automatic releasing mechanism for a sounding balloon. A sounding balloon inflating device comprises an inflating nozzle, an air supply source, an executing unit and a processing unit. The automatic releasing mechanism for the sounding balloon comprises a locking element, a sliding block and an operating lever. The sliding block can sliding along the inflating nozzle and is provided with a first position and a second position. The locking element is provided with a clamping hook, is arranged on the periphery of the inflating nozzle and is rotatably connected with the inflating nozzle and the sliding block. When the sliding block slides to the first position, the clamping hook is in clearance fit with the surface of the inflating nozzle. When the sliding block slides to the second position, the clamping hook is staggered with the surface of the inflating nozzle. The operating lever is installed on the sliding block and is operationally in contact with the executing unit.

When the processing unit outputs a first control signal, the locking element clamps the check valve of the sounding balloon. When the processing unit outputs a second control signal, the locking element releases the check valve of the sounding balloon. The utility model realizes the automatic release of the sounding balloon under the situation of no human intervention.

WO 2010/061034 A1 discloses an arrangement for a launcher for sonde units and a method for launching a sonde unit from a generic launcher. The arrangement according to the invention comprises at least one sonde case, which has a generic body for storing a sonde unit, a generic launch base for receiving a sonde case, which launch base has means for launching the sonde unit, generic means for creating a sonde connection between the launcher and a radiosonde, a mechanical adapter, which is arranged to connect to the generic body and the sonde unit, and which is arranged to convert the generic launch means of the launch base to become meteorological-balloon and sonde- specific, as well as an adapter unit, which is arranged to connect to the mechanical adapter, and which is arranged to convert the generic sonde connection to be radiosonde-specific.

WO 2010/000942 A1 describes an automatic balloon release apparatus for sonde units and a method for automatically releasing sonde units, the balloon release apparatus comprising at least one balloon reserve for storing at least one sonde unit, control means for controlling the filling operation, filling means for filling the balloons of the sonde units of the balloon reserve and release means for releasing the sonde unit. The balloon reserve of the apparatus according to the invention is formed of a basket-like matrix, removable as a unit, with gas fill conduits being brought into connection therewith for filling the balloon of each sonde unit. In the method according to the invention the sonde units are stored pre-charged in the balloon reserve prior to release and the sonde unit is released by means of an automatic balloon release apparatus according to the invention. In the method the balloon reserve is kept stationary during storage and release. In case of a malfunction the next suitable sonde unit is chosen for release from the balloon reserve.

US 2005/0006523 A1 teaches an automated balloonsonde launcher and a method for an automated balloonsonde launch. The automated balloonsonde launcher, for example, may comprise a collapsible protective cover forming an inner region for receiving a balloon, a gas inlet for receiving a gas, a gas outlet for mating with a balloon, a valve operable between the gas inlet and the gas outlet for inflating a balloon within the inner region of the protective cover. The launcher further comprises a controller that controls the valve to inflate a balloon within the protective cover, opens an opening in the protective cover and releases a balloon through the opening of the protective cover.

U.S. Pat. No. 5,895,010 describes a radiosonde balloon launching system including a silo for housing an array of radiosonde balloon modules and for sheltering radiosonde balloons during inflation, a base for containing radiosonde balloon inflation and launch apparatus and a device for shielding the silo until the radiosonde balloons are ready to be launched.

SUMMARY OF THE INVENTION

Certain embodiments of the present invention are based on the object to provide an automated balloon launching system. Embodiments of the invention are particularly useful in launching at least one balloon such as a meteorological balloon or a radiosonde. Another object of certain embodiments of the invention is to provide an automated balloon launching system for launching a series of balloons without human intervention. Further, an object of certain embodiments of the invention is to provide a method for launching a balloon.

These and other objects are achieved by the embodiments of the present invention, as hereinafter described and claimed. According to an aspect of the invention, there is provided an automated balloon launching system for launching at least one balloon such as a meteorological balloon or a radiosonde, the system comprising:

a container, a storage arranged in the container for storing at least one box at a defined storage position $p=1, 2, \ldots, n$, the at least one box including a balloon and a sonde, a release silo arranged at least partially on top of or above and adjacent to the container for sheltering the balloon during inflation, and a x-, y- and z-manipulator arranged in the container for feeding the storage with at least one box, and/or removing a specific box from one of the defined storage positions $p=1, 2, \ldots, n$ and subsequent feeding the release silo with the specific box through an opening in the container.

In an embodiment, the system is comprising means for sealing the opening in the container gas tightly. In another embodiment, the system is including at least one storage tank for a gas arranged outside of the container. According to an embodiment, the system is including a gas pipeline arranged outside of the container and connected to the at least one storage tank for gas and to a gas outlet valve arranged in the release silo. Further, the system is including a ventilation system in the release silo according to an embodiment.

In an embodiment, the storage is including at least one storage rack with an integer number n of defined storage positions $p=1, 2, \ldots, n$. In another embodiment, the defined storage positions p=1, 2, . . . , n are arranged in l lines and c columns. The integer number n of defined storage positions p=1, 2, . . . , n is, for example, n=30, n=50 or n=70.

According to an embodiment, the release silo is including a movable protective cover. The movable protective cover is preferably comprising two movable members, each movable member having a single rotatory degree of freedom with respect to the release silo. According to another embodiment, the release silo is further comprising means for removing a burst balloon.

In an embodiment, the at least one box or the sonde is including a RFID tag for the purpose of identifying and tracking the at least one box or the sonde at the defined storage position p=1, 2, . . . , n. The at least one box or the sonde may be connected to the automated balloon launching system by a galvanic contact.

In an embodiment, the container is including a generator for power generation, at least one photovoltaic module for power generation, a computer system for storing measurement data and/or means for wireless telecommunication.

The release silo, the means for sealing the opening in the container and/or the at least one storage tank for a gas are arranged to improve safety of an operator.

According to another aspect, the object of embodiments of the invention can be achieved by a method for launching of at least one balloon such as a meteorological balloon or a radiosonde, the method comprising:
a) feeding at least one box including a balloon and a sonde into a storage arranged in a container,
b) removing a specific box from a defined storage position p=1, 2, . . . , n by a x-, y- and z-manipulator arranged in the container,
c) feeding a release silo arranged at least partially on top of or above and adjacent to the container through an opening in the container with the specific box by the x-, y- and z-manipulator,
d) filling the balloon with a fluid medium such as a gas lighter than air within the release silo, and
e) releasing the balloon of the specific box through an release opening of the release silo.

In an embodiment, the at least one box including a balloon and a sonde is fed into the storage arranged in the container manually or by the x-, y- and z-manipulator.

In another embodiment, a second specific box is removed from another defined storage position p=1, 2, . . . , n by the x-, y- and z-manipulator after a time interval t. Then the release silo is fed through the opening in the container with the second specific box by the x-, y- and z-manipulator, the balloon of the second specific box is filled with a fluid medium such as a gas lighter than air within the release silo, and the balloon of the second specific box is released through an opening in the release silo. Subsequently the empty box is removed from the release silo by the x-, y- and z-manipulator and fed into the storage.

According to an embodiment, the time interval t is, for example, comprising the values t=1 [h], t=6 [h], t=12 [h], and t=24 [h]. The time interval t can also be dependent on the weather conditions. A series of balloons may be released in a continuous process. i.e. a first box is removed from the storage, the release silo is fed with the first box, the first balloon is filled with a fluid medium, the first balloon is released, the first box is removed from the release silo and fed into the storage, a second box is removed from the storage, the release silo is fed with the second box, the second balloon is filled with a fluid medium, the second balloon is released, the second box is removed from the release silo and fed into the storage, and so on.

In an embodiment, the fluid medium is comprising hydrogen, helium or methane.

According to an embodiment, the opening in the container is gas tightly sealed after feeding the release silo through the opening in the container with the specific box by the x-, y- and z-manipulator.

According to another embodiment, the mass flow of the fluid medium is measured during filling the balloon for calculating the lift of the balloon. The weight of the balloon is preferably measured during and/or after filling the balloon for calculating the lift of the balloon. Preferably, the balloon is filled with the fluid medium until a predetermined lift of the balloon is reached.

Considerable advantages are obtained by means of the embodiments of the present invention. The automated balloon launching system enables automatic launching of at least one balloon. The system in particular enables automatic launching of a series of balloons without human intervention. The storage rack has to be refilled with boxes, each including a balloon and a sonde, depending on the balloon launching frequency. For example, if 70 boxes are stored in the storage rack and the launching time interval is t=24 [h], i.e. one balloon per day, the automated balloon launching system according to the embodiment of the present invention can operate for more than two months without human intervention.

In addition, the release silo arranged at least partially on top of or above and adjacent to the container improves and secures safety of an operator. Arrangement of the release silo, the storage tank for gas and the gas pipeline outside of the container enables use of hydrogen as fluid medium for filling the balloons. Use of hydrogen reduces operational costs of the system. Also any other suitable gas lighter than air can be used for filling the balloons. Balloons are further filled with the fluid medium within the release silo and bursting balloons cannot harm the operator. The container is sealed gas tightly after feeding the release silo with a specific box including a balloon and a sonde. The system according to the embodiment of the invention can be therefore classified as "EX-safe" (explosion safe).

Arrangement of the release silo at least partially on top of or above and adjacent to the container eliminates the possibility of a gas flow of a gas lighter than air in a direction downstream into the container. Of course, a gas flow of a gas lighter than air in a direction upstream from the release silo into the container is not possible. Since explosive gases such as hydrogen are typically used for filling the balloons of a radiosonde for cost reasons, arrangement of the release silo on top of the container improves safety of the balloon launching system. Complex mechanical structures in order to avoid a downstream gas flow into the container are not necessary according to the embodiments of the invention. This reduces, for example, production time of the system, weight of the system, and costs of the system. Additionally, the level of a potential explosion will be above the level of an operator during operation of the balloon launching system.

According to certain embodiments, the opening in the container can be arranged in the roof of the container. According to certain other embodiments, the opening in the container is arranged in a side wall of the container. Designing a water and gas tight opening mechanism to the side wall 16 of the container 3 may be easier than to the roof of the container 3. Additionally, issues with accumulating water on top of the opening or with objects such as leaves or dirt landing on the roof and eventually ending between the opening and its closure mechanism do not occur.

Beside improving and securing safety of an operator, systems of the "Ex-safe" type can be used in any environment, for example in security relevant environments such as airports, harbours or industrial plants. The release silo also shelters the balloon during inflation, e.g. from wind, rain or snow.

If the automated balloon launching system is further equipped with a generator for power generation or at least one photovoltaic module, a computer system for storing radiosonde measurement data such as temperature or air humidity, and means for wireless telecommunication, autonomous operation of the system is possible and radiosonde measurement data can be transmitted to a control station.

When storing the detachable release silo in the container, the automated balloon launching system can be further easily transported, e.g. by truck, ship, plane or railway, to any desired place of installation such as for example an island or a location in an arctic region.

BRIEF DESCRIPTION OF THE DRAWINGS

For a more complete understanding of particular embodiments of the present invention and their advantages, reference is now made to the following descriptions, taken in conjunction with the accompanying drawings. In the drawings.

DETAILED DESCRIPTION OF EMBODIMENTS OF THE INVENTION

Figure 1:
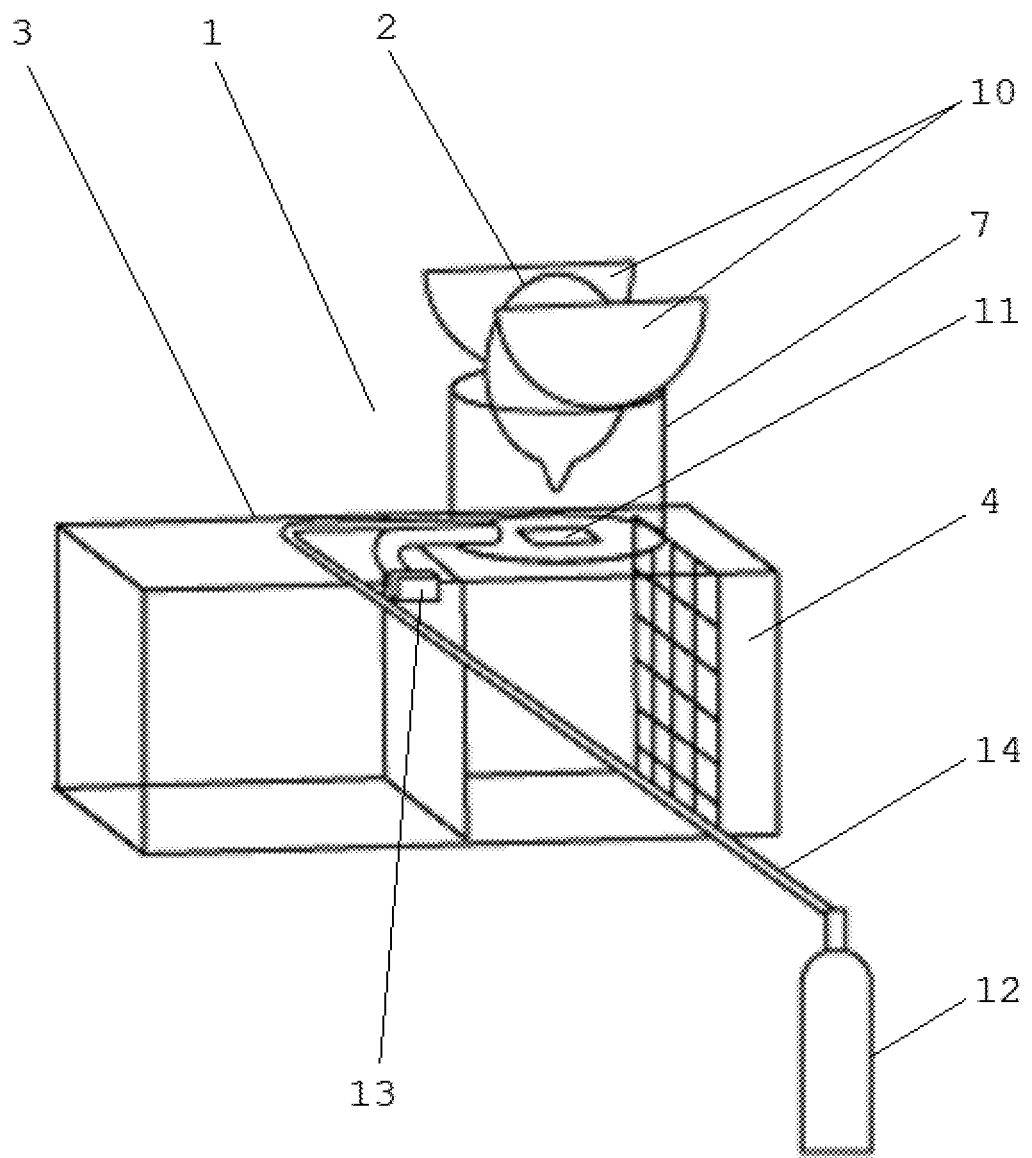
FIG. 1 illustrates a schematic view of an automated balloon launching system according to at least some embodiments of the invention.

In FIG. 1 a schematic view of an automated balloon launching system 1 for launching at least one balloon 2 such as a meteorological balloon or a radiosonde according to at least some embodiments of the invention is shown. The system 1 is comprising a container 3 with a storage 4 arranged in the container 3 for storing at least one box 5, which is not shown in FIG. 1, at a defined storage position $p=1, 2, \ldots, n$. The at least one box 5 includes a balloon 2 and a sonde 6. A release silo 7 is arranged on top of the container 3 for sheltering the balloon 2 during inflation. In other words, the release silo 7 is arranged above the container 3. The release silo 7 may be detachable. In the container 3 a x-, y- and z-manipulator 8, which is not shown in FIG. 1, is arranged for feeding the storage with at least one box, for removing a specific box 5 from one of the defined storage positions $p=1, 2, \ldots, n$, and for subsequent feeding the release silo 7 with the specific box 5 through an opening 11 in the container 3.

The opening 11 in the container 3 may be gas tightly sealed after feeding the release silo 7 with a specific box 5. The opening 11 is arranged through the top wall of the container 3, i.e. in the roof of the container. Outside of the container 3 a storage tank 12 for gas, e.g. helium or hydrogen, may be arranged. A gas pipeline 14 arranged outside of the container 3 may be connected to the storage tank 12 for gas and to a gas outlet valve arranged in the release silo 7. Since the gas used is lighter than air, gas cannot flow in a direction upstream from the release silo 7 into the container 3 during filling of a balloon 2. Also the possibility of a gas flow into a direction downstream into the container 3 is eliminated. The system 1 may further include a ventilation system for ventilation of the release silo. Gas can be removed from the release silo 7 in case of gas leaking into the release silo 7. The system 1 according to the embodiment of the invention can be classified as "EX-safe" (explosion safe) and may be, for example, used in security relevant environments such as airports, harbours or industrial plants.

Another embodiment of the system 1 according to the invention may include a generator for power generation, a computer system for storing measurement data and/or means for wireless telecommunication. The generator for power generation may be for example a gas or fuel generator. According to a certain embodiment, the gas generator is a hydrogen generator. In another embodiment of the system 1 at least one outer surface of the container 3 may be further equipped with at least one photovoltaic module for power generation. The system 1 may also include an electrical connection for power supply.

Figure 2:
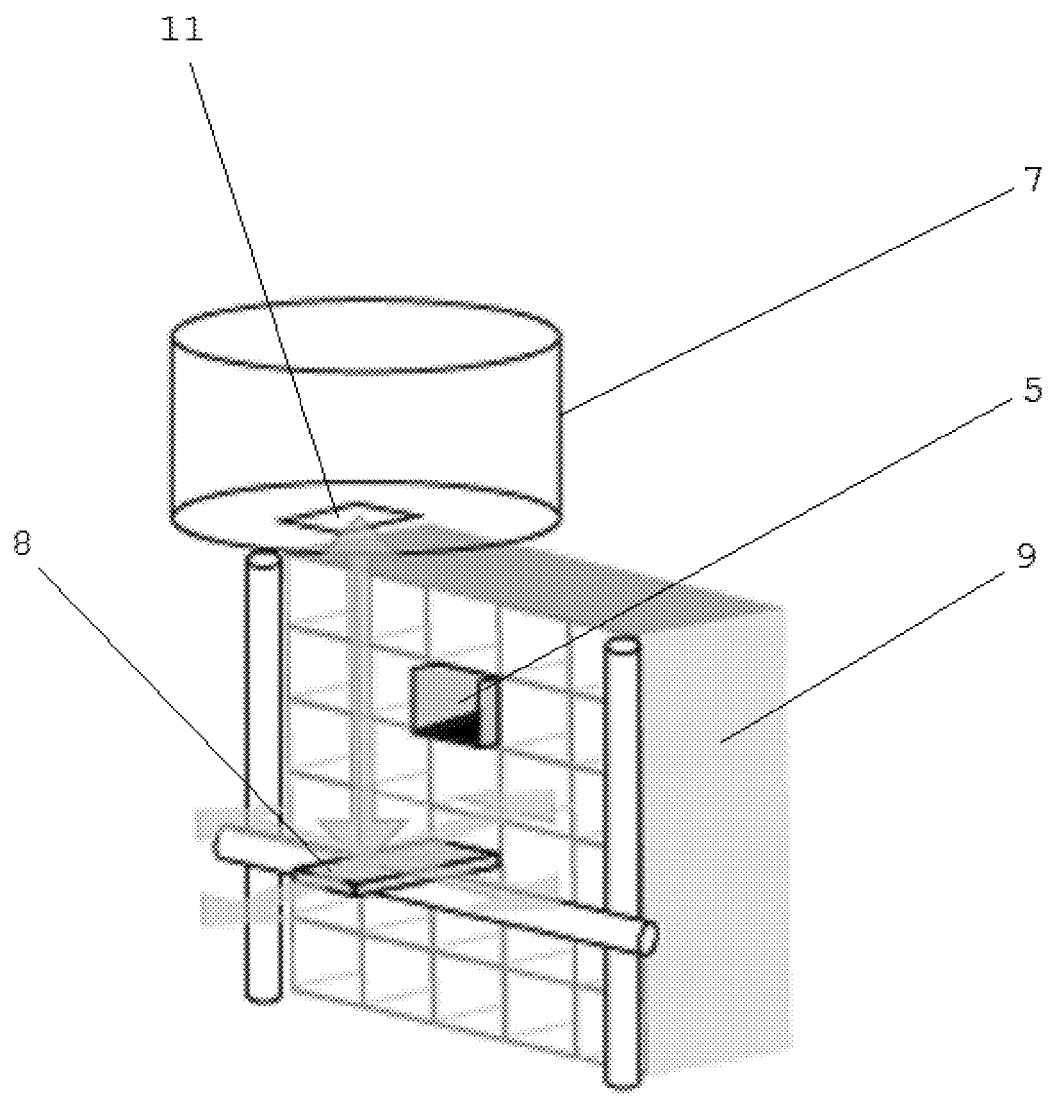
FIG. 2 illustrates a schematic view of a storage rack and a x-, y- and z-manipulator of an automated balloon launching system according to at least some embodiments of the invention.

In FIG. 2 a schematic view of a storage rack 9 and a x-, y- and z-manipulator 8 of an automated balloon launching system 1 according to at least some embodiments of the invention is illustrated. Preferably, the storage 4 is including a storage rack 9 with an integer number n of defined storage positions $p=1, 2, \ldots, n$. The defined storage positions $p=1, 2, \ldots, n$ are arranged in l lines and c columns. The integer number n of defined storage positions $p=1, 2, \ldots, n$ may be, for example, n=30, n=50 or n=70. The x-, y- and z-manipulator 8 can handle boxes 5 in x-, y- and z-direction. The manipulator 8 can feed the storage rack 9 with a box 5 at a defined position $p=1, 2, \ldots, n$, for example at position p=8 in the second line and the third column of the storage rack 9 of the storage 4. The manipulator 8 can also remove a specific box from one of the defined position $p=1, 2, \ldots, n$ and feed the release silo 7 with the removed box 5 through an opening 11 in the container 3 subsequently. Each box 5 or sonde 6 in the storage rack 9 may include a RFID tag for the purpose of identifying and tracking the box 5 or the sonde 6 at the defined storage position $p=1, 2, \ldots, n$.

Figure 3:
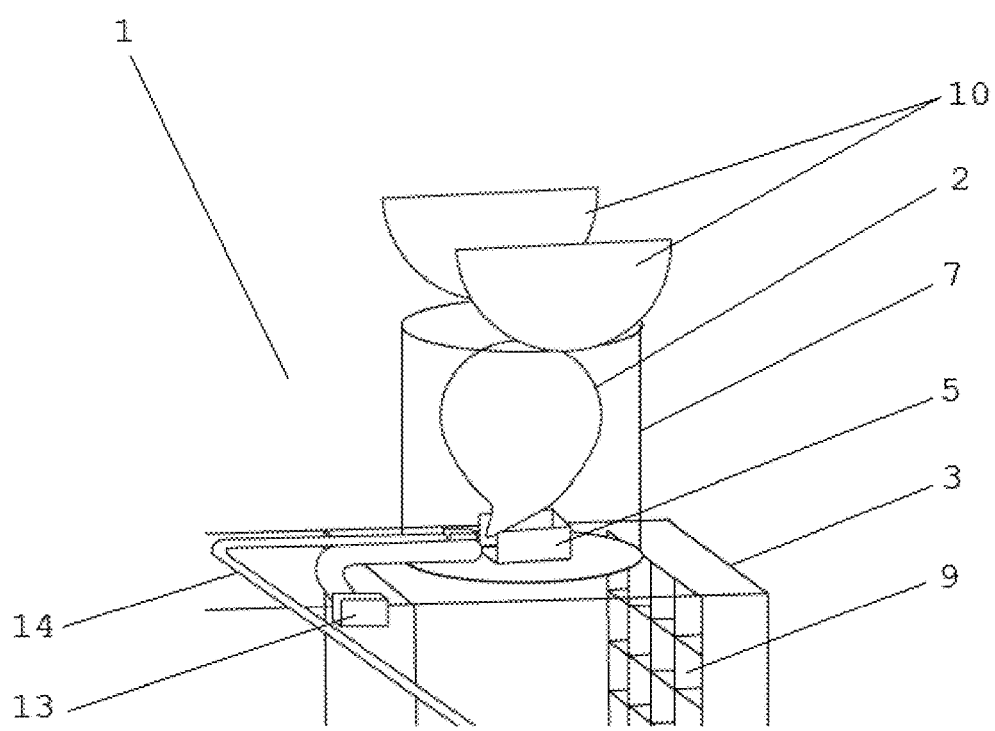
FIG. 3 illustrates a schematic view of an automated balloon launching system for launching at least one balloon according to at least some embodiments of the invention.

In FIG. 3 a schematic view of an automated balloon launching system 1 for launching at least one balloon 2 such as a meteorological balloon or a radiosonde according to at least some embodiments of the invention is illustrated. After feeding the release silo 7 with a specific box 5 the opening 11 in the container 3 may be gas tightly sealed. The release silo 7 shelters the balloon 2 during inflation, e.g. from wind, rain or snow. During inflation of the balloon 2 a movable protective cover 10 for covering a release opening in the release silo 7 may be in an open or closed position. The system 1 according to the embodiment of the invention may include means for measuring the mass flow of gas or the weight of the balloon 2 during filling the balloon 2 with the gas. The measurement data may be used for calculating the lift of the balloon 2. The balloon 2 may be filled with the gas until a predetermined lift of the balloon 2 is reached. The balloon 2 may be then released through the release opening in the release silo 7. Subsequently the empty box 5 is removed from the release silo 7 by the x-, y- and z-manipulator 8 and fed into the storage 4.

Figure 4:
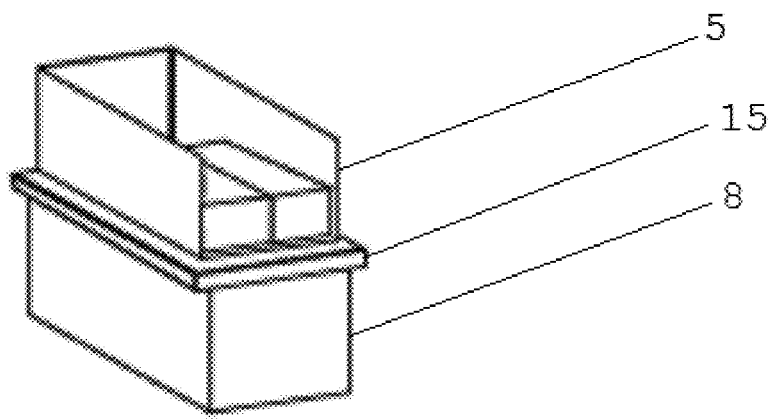
FIG. 4 illustrates a schematic view of a part of the manipulator and a box of an automated balloon launching system according to at least some embodiments of the invention.

In FIG. 4 a schematic view of a part of the manipulator 8 and a box 5 of an automated balloon launching system 1 according to at least some embodiments of the invention is illustrated. After feeding the release silo 7 with a specific box 5 the opening of the container 3, which is not shown in FIG. 4, may be sealed gas tightly by the ground plate 15 of the manipulator 8. A gasket ring may be arranged on the ground plate 15 to seal the opening 11 in the container 3 gas tightly as long as the manipulator 8 exerts a force in z-direction.

Figure 5:
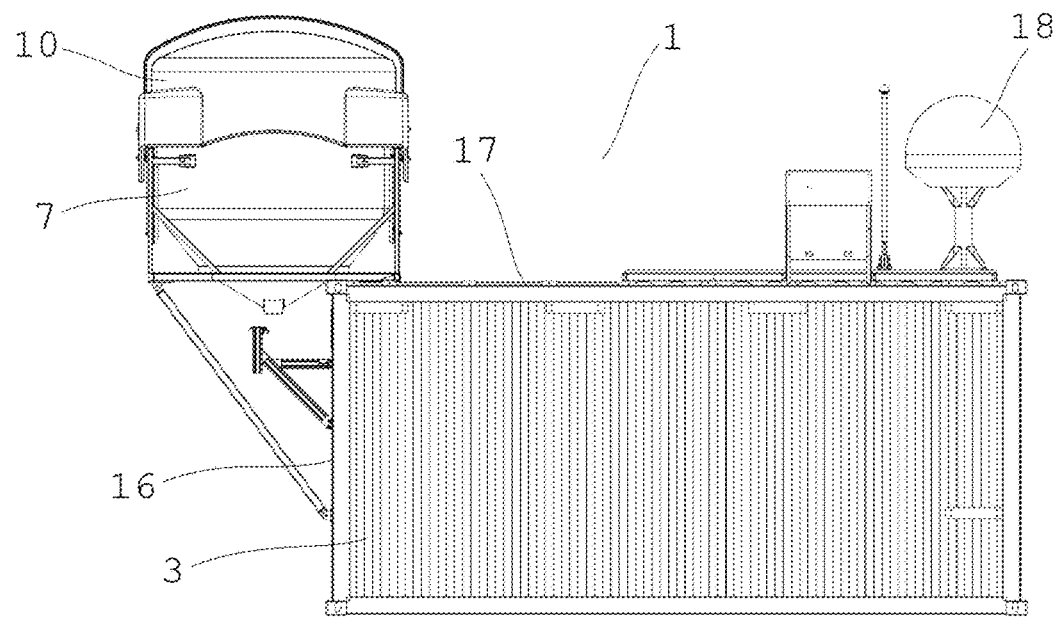
FIG. 5 illustrates a schematic side view of an automated balloon launching system according to at least some embodiments of the invention.

In FIG. 5 a schematic side view of an automated balloon launching system 1 according to at least some embodiments of the invention is illustrated. The automated balloon launching system 1 for launching at least one balloon such as a meteorological balloon or a radiosonde comprises a container 3, a storage (not shown) arranged in the container 3 for storing at least one box (not shown) at a defined storage position p=1, 2, ..., n, the at least one box including a balloon and a sonde, a release silo 7 arranged at least partially on top of the container 3 for sheltering the balloon during inflation, and a x-, y- and z-manipulator (not shown) arranged in the container 3 for feeding the storage with at least one box, and/or removing a specific box from one of the defined storage positions p=1, 2, ..., n and subsequent feeding of the release silo 7 with the specific box through an opening (not shown) in the container 3. According to certain embodiments, the release silo 7 can be also arranged above and adjacent to the container 3.

According to the illustrated embodiment, the opening in the container 3 is arranged in one of the side walls of the container 3. In other words, the release silo 7 can be fed with the specific box comprising the balloon and the sonde through the opening in the side wall 16 of the container 3 instead of the top wall 17 of the container 3. The system comprises means for sealing the opening in the container 3 gas tightly.

The release silo 7 includes a movable protective cover 10 for covering a release opening. The automated balloon launching system 1 further includes means for wireless telecommunication 18.

Figure 6:
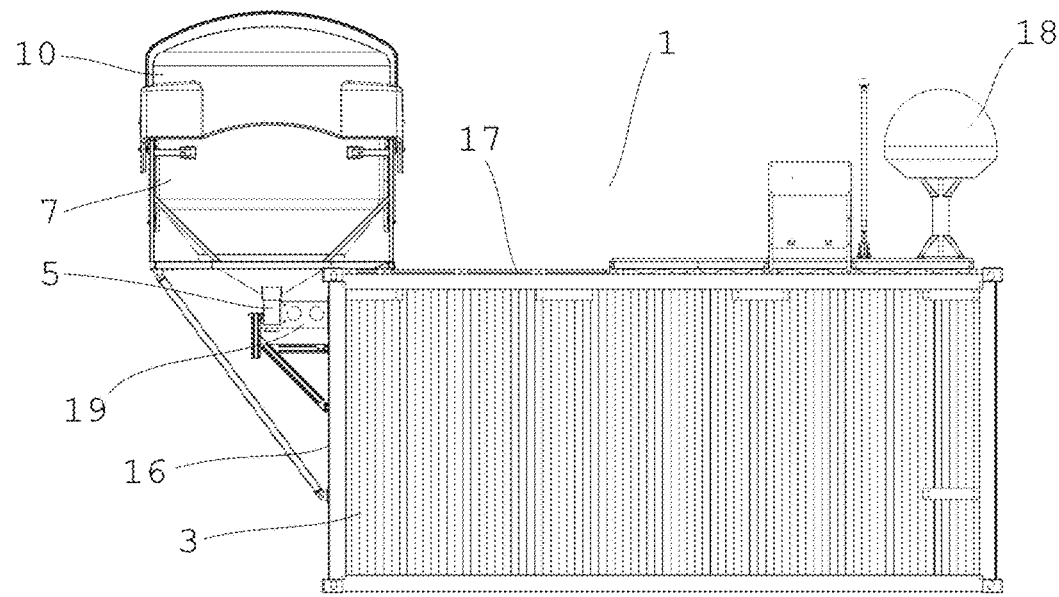
FIG. 6 illustrates a schematic side view of an automated balloon launching system according to at least some embodiments of the invention.

In FIG. 6 a schematic side view of an automated balloon launching system 1 according to at least some embodiments of the invention is illustrated. In FIG. 6 the system shown in FIG. 5 is shown in another operational mode. In FIG. 6 a box 5 including a balloon and a sonde is fed to an inflation point below the release silo 7. In this position the balloon (not shown) inside the box 5 can be filled with gas and be released through the release opening (not shown) of the release silo 7 after opening the protective cover 10 of the release silo 7. The box 5 may be moved to the inflation point by means of the x-, y-, and z-manipulator (not shown) through an opening (not shown) of the container 3 from within the container 3 via a linear guidance 19, for instance.

Figure 7:
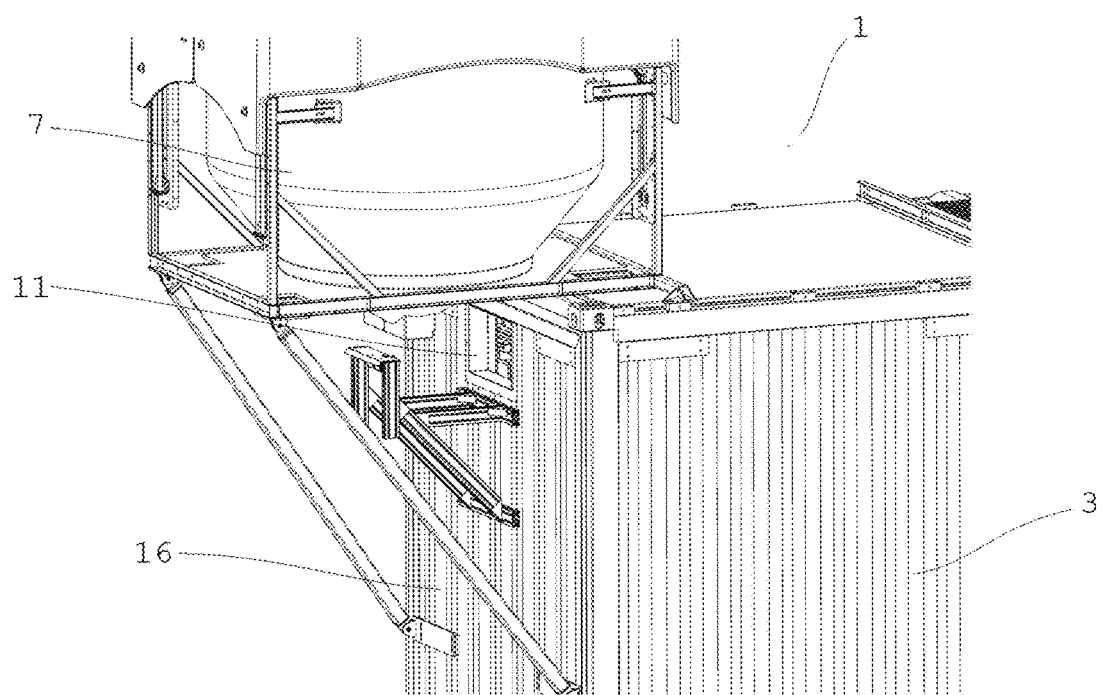
FIG. 7 illustrates a schematic perspective view of details of an automated balloon launching system according to at least some embodiments of the invention.

In FIG. 7 a schematic perspective view of details of an automated balloon launching system 1 according to at least some embodiments of the invention is illustrated. The opening 11 in the side wall 16 of the container 3 is shown in an open position. Prior to feeding a box (not shown) including a balloon and a sonde to the inflation point, the opening 11 is opened. Subsequently, the x-, y-, and z-manipulator can feed a box through the opening 11 in a substantially horizontal direction to the inflation point. Next, the opening 11 is closed prior to inflation of the balloon in the release silo 7.

Figure 8:
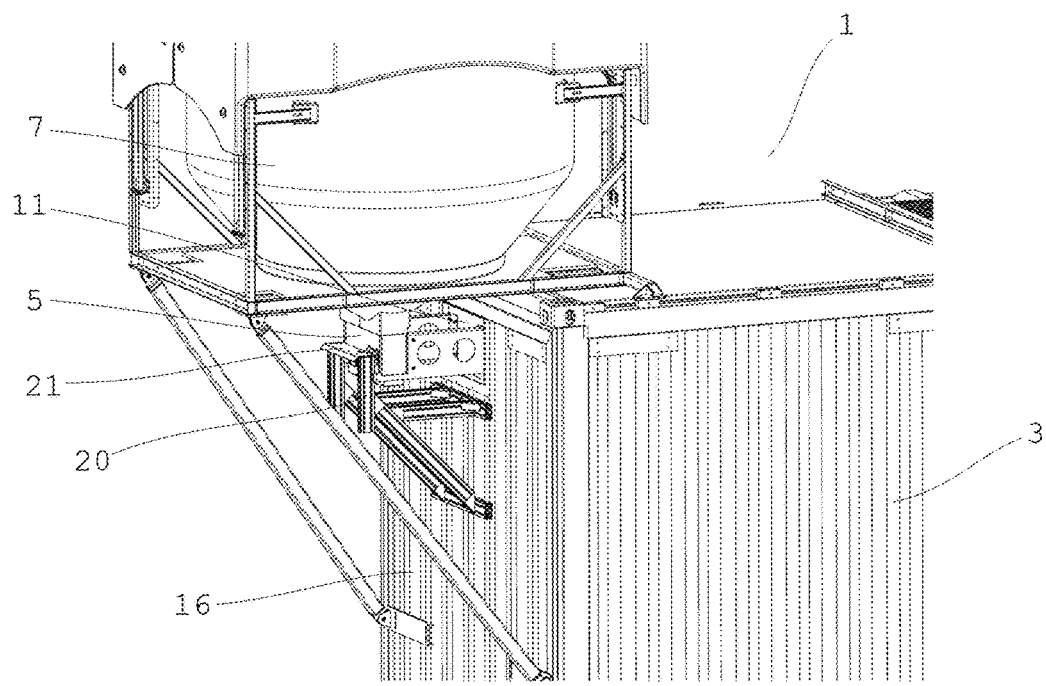
FIG. 8 illustrates a schematic perspective view of details of an automated balloon launching system according to at least some embodiments of the invention.

In FIG. 8 a schematic perspective view of details of an automated balloon launching system 1 according to at least some embodiments of the invention is illustrated. The release silo 7 is at least partially arranged on top of the container 3 for sheltering the balloon during inflation. The release silo 7 is supported by an external construction outside of the container 3. The external construction may be detachable and can then be stored inside the container 3 during transportation of the container 3.

A specific box 5 can be removed from a storage (not shown) inside the container 3 by a x-, y- and z-manipulator (not shown) and subsequently be fed through an opening in the side wall 16 of the container 3 in order to provide a balloon and a sonde outside of the container 3 in an inflation position. The system 1 comprises means for sealing the opening 11 in the container 3 gas tightly and/or water tightly. In FIG. 8, the opening 11 is sealed gas tightly. A supporting structure 20 provides a stopper 21 in order to align the box 5 and an inlet of the release silo 7. When the box 5 touches the stopper 21, the box 5 has reached the inflation point and inflation of the balloon in the release silo 7 can be started.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

According to the present invention, the term box 5 means a container including a balloon and a sonde. In accordance with the invention, this box 5 may be of any shape and can be rigid or elastic, for instance.

LIST OF REFERENCE NUMBERS

1 automated balloon launching system
2 balloon
3 container
4 storage
5 box
6 sonde
7 release silo
8 x-, y- and z-manipulator
9 storage rack
10 protective cover
11 opening
12 storage tank
13 ventilation system
14 gas pipeline
15 ground plate
16 side wall
17 top wall
18 means for wireless telecommunication
19 linear guidance
20 supporting structure
21 stopper
c column
l line
p defined storage position
t time interval

The invention claimed is:

1. Automated balloon launching system for launching at least one balloon such as a meteorological balloon or a radiosonde, the system comprising:
   a container,
   a storage arranged in the container for storing at least one box at a defined storage position p=1, 2, . . . , n, the at least one box including a balloon and a sonde,
   a release silo arranged at least partially on top of or above and adjacent to the container for sheltering the balloon during inflation, and
   a x-, y- and z-manipulator arranged in the container for feeding the storage with at least one box, and/or removing a specific box from one of the defined storage positions p=1, 2, . . . , n and subsequent feeding the release silo with the specific box through an opening in the container.

2. The automated balloon launching system according to claim 1, the system comprising means for sealing the opening in the container gas tightly.

3. The automated balloon launching system according to claim 1, the system including at least one storage tank for a gas arranged outside of the container.

4. The automated balloon launching system according to claim 1, the system including a ventilation system in the release silo.

5. The automated balloon launching system according to claim 1, the system including a gas pipeline arranged outside of the container and connected to the at least one storage tank for gas and to a gas outlet valve arranged in the release silo.

6. The automated balloon launching system according to claim 1, the storage including at least one storage rack with an integer number n of defined storage positions p=1, 2, . . . , n.

7. The automated balloon launching system according to claim 1, the defined storage positions p=1, 2, . . . , n arranged in l lines and c columns.

8. The automated balloon launching system according to claim 1, wherein the integer number n of defined storage positions p=1, 2, . . . , n is n=30, n=50 or n=70.

9. The automated balloon launching system according to claim 1, wherein the release silo is including a movable protective cover for covering a release opening.

10. The automated balloon launching system according to claim 1, the at least one box or the sonde including a RFID tag for the purpose of identifying and tracking the at least one box or the sonde at the defined storage position p=1, 2, . . . , n.

11. The automated balloon launching system according to claim 1, wherein the at least one box or the sonde is connected to the automated balloon launching system by a galvanic contact.

12. The automated balloon launching system according to claim 1, the system including a generator for power generation, at least one photovoltaic module for power generation, a computer system for storing measurement data and/or means for wireless telecommunication.

13. The automated balloon launching system according to claim 1, wherein the release silo, the means for sealing the opening in the container and/or the at least one storage tank for a gas are arranged to improve and secure safety of an operator.

14. Method for launching at least one balloon such as a meteorological balloon or a radiosonde, the method comprising:
   a) feeding at least one box including a balloon and a sonde into a storage arranged in a container,
   b) removing a specific box from a defined storage position p=1, 2, . . . , n by a x-, y- and z-manipulator arranged in the container,
   c) feeding a release silo arranged at least partially on top of or above and adjacent to the container through an opening in the container with the specific box by the x-, y- and z-manipulator, d) filling the balloon with a fluid medium such as a gas lighter than air within the release silo, and
e) releasing the balloon of the specific box through an release opening of the release silo.

15. The method according to claim 14, wherein the at least one box including a balloon and a sonde is fed into the storage arranged in the container manually or by the x-, y- and z-manipulator.

16. The method according to claim 14, wherein
a) a second specific box is removed from another defined storage position p=1, 2, . . . , n by the x-, y- and z-manipulator after a time interval,
b) the release silo is fed through the opening in the container with the second specific box by the x-, y- and z-manipulator,
c) the balloon of the second specific box is filled with a fluid medium such as a gas lighter than air within the release silo, and
d) the balloon of the second specific box is released through an opening in the release silo.

17. The method according to claim 16, wherein the time interval t comprises the values t=1 [h], t=6 [h], t=12 [h], and t=24 [h].

18. The method according to claim 14, wherein the fluid medium comprises hydrogen, helium or methane.

19. The method according to claim 14, wherein the opening in the container is gas tightly sealed after feeding the release silo through the opening in the container with the specific box by the x-, y- and z-manipulator.

20. The method according to claim 14, wherein the mass flow of the fluid medium is measured during filling the balloon for calculating the lift of the balloon.

21. The method according to claim 14, wherein the weight of the balloon is measured during and/or after filling the balloon for calculating the lift of the balloon.

22. The method according to claim 20, wherein the balloon is filled with the fluid medium until a predetermined lift of the balloon is reached.

* * * * *